Nov. 11, 1952 — F. D. KNOBLOCK — 2,617,680
GLARE SHIELD FOR AUTOMOTIVE VEHICLES
Filed Dec. 23, 1949 — 3 Sheets-Sheet 1
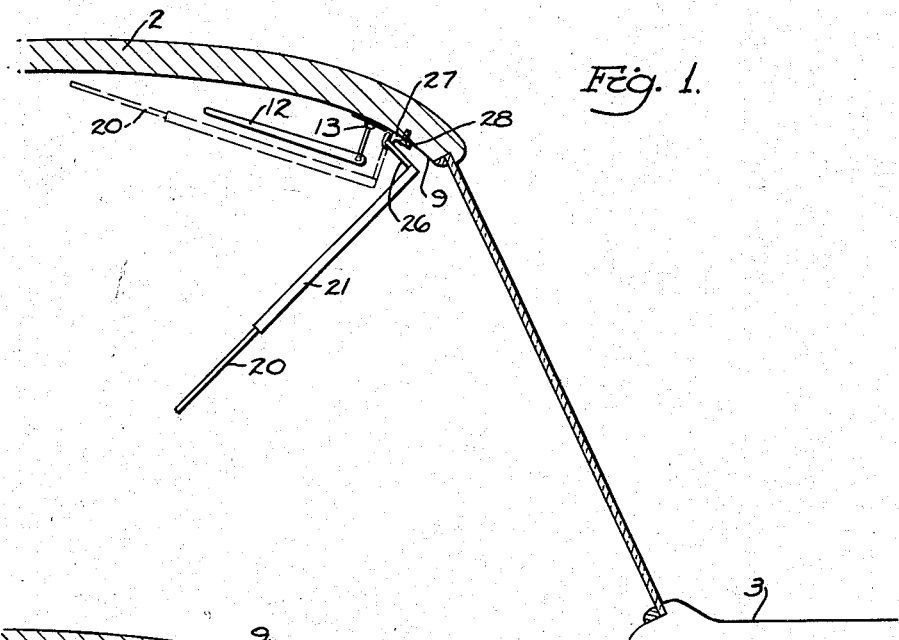
Fig. 1.
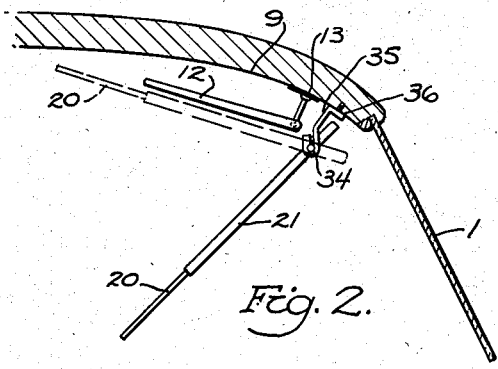
Fig. 2.
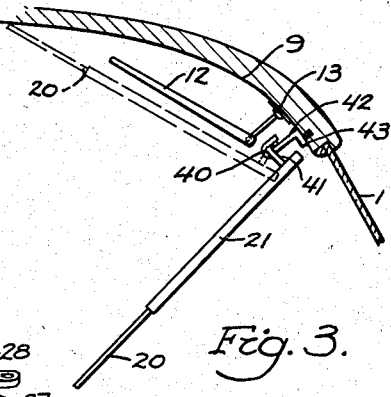
Fig. 3.
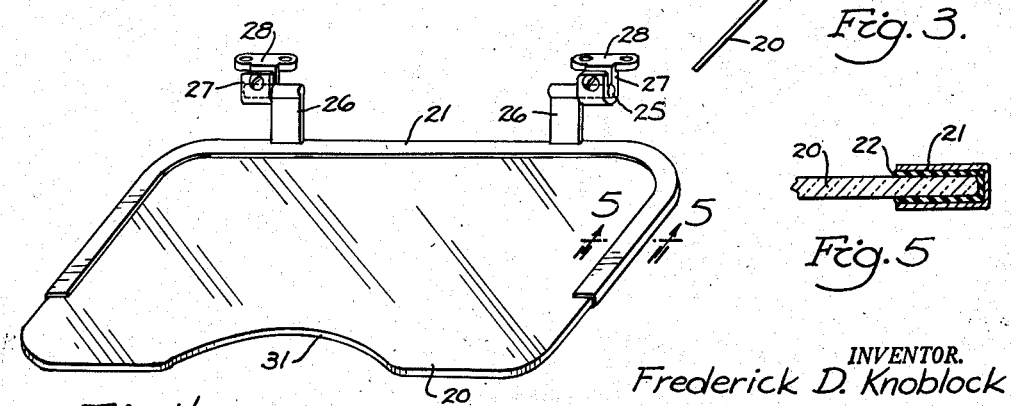
Fig. 4.
Fig. 5.
INVENTOR.
Frederick D. Knoblock
BY Barnes Russell Laughlin & Raisch
Attorneys.

Nov. 11, 1952 F. D. KNOBLOCK 2,617,680
GLARE SHIELD FOR AUTOMOTIVE VEHICLES
Filed Dec. 23, 1949 3 Sheets-Sheet 2
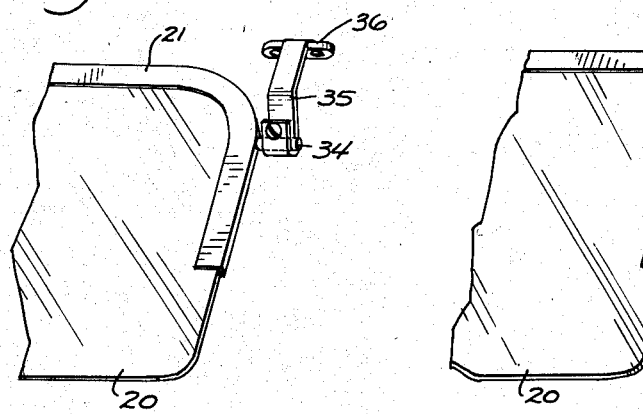
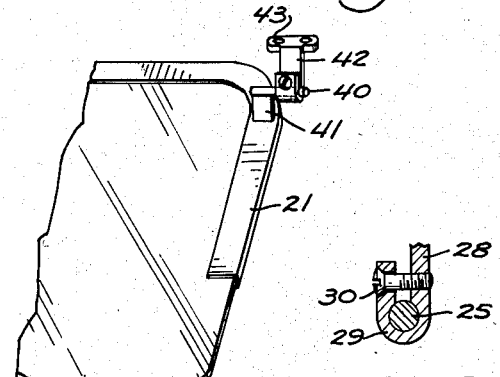
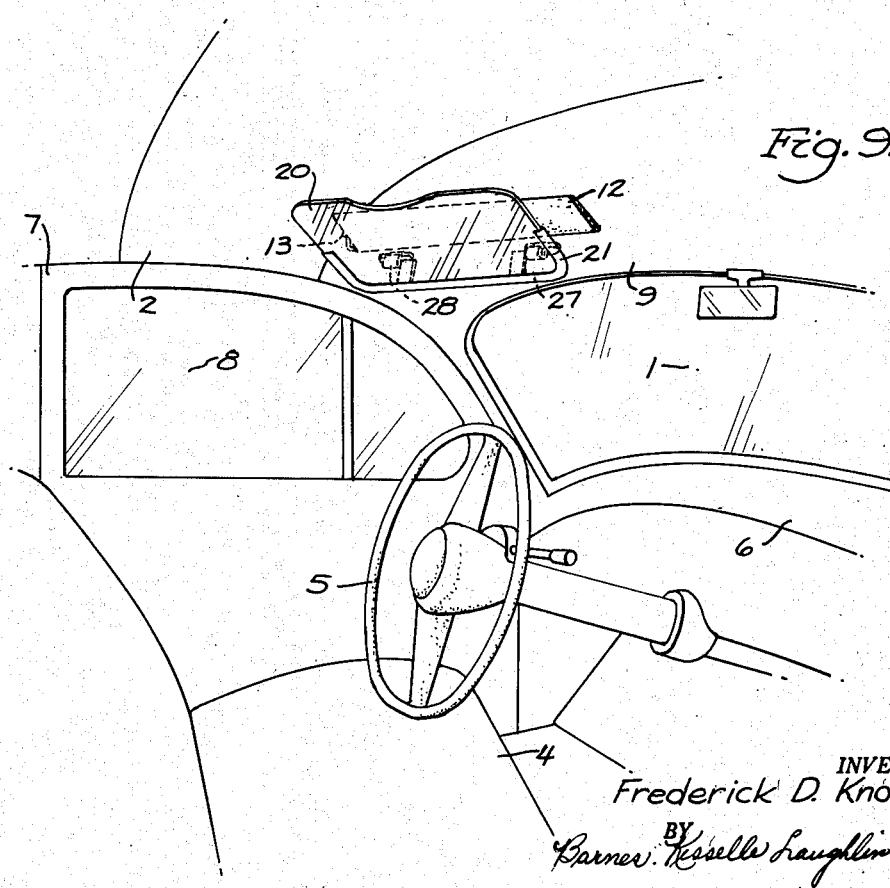
INVENTOR.
Frederick D. Knoblock
BY Barnes, Kiesselle Laughlin & Rauch
Attorneys.

Nov. 11, 1952        F. D. KNOBLOCK        2,617,680
GLARE SHIELD FOR AUTOMOTIVE VEHICLES

Filed Dec. 23, 1949                            3 Sheets-Sheet 3

INVENTOR.
Frederick D. Knoblock
BY
Barnes, Kisselle, Laughlin & Raisch
Attorneys.

Patented Nov. 11, 1952

2,617,680

UNITED STATES PATENT OFFICE 2,617,680

GLARE SHIELD FOR AUTOMOTIVE VEHICLES

Frederick D. Knoblock, Birmingham, Mich., assignor to Hildegarde T. Knoblock, Bloomfield Hills, Mich.

Application December 23, 1949, Serial No. 134,785

1 Claim. (Cl. 296—97)

This invention relates to the matter of protecting the eyes of the occupants of, and particularly the driver of, an automotive vehicle from direct and reflected light rays of the sun.

It is well appreciated that it is ofttimes particularly difficult and hazardous to drive an automobile, when direct or reflected light rays pass to the driver's eyes. The other occupant or occupants of the front seat of a vehicle are likewise affected and the invention may be used for protecting these other occupants whether in a passenger vehicle or a commercial vehicle.

One object of the invention is to provide a device applicable to an automotive vehicle to minimize glare of reflected light in the eyes of the occupant or occupants to the end that sun glasses need not be employed. It is appreciated, moreover, that the almost universal practice is to equip vehicles, and particularly passenger vehicles, with an opaque inside visor. This visor is usually adjustably mounted so that it can be moved into and out of operating position to various degrees. The main purpose of the opaque visor is to stop the direct sun rays from reaching the eyes of the driver. But because it is opaque, it is necessary for the driver to adjust the visor so that it is out of the direct line of vision, and thus it is of no value as a protection against the indirect reflected sun glare.

The opaque inside visor may be considered as an indispensable device for the purpose for which it is useful and the device of the present invention is not intended to replace the inside visor but to be used in conjunction therewith. It is a further object of the invention, therefore, to provide a ray filtering element or glare shield which can be mounted in a vehicle in such a manner that there is a minimum of interference in the movements given to the visor and the glare shield in their manipulation. The glare shield mounting does not interfere with the use of the visor, in that the visor may be adjusted to all positions, which its mounting permits, and both the visor and the glare shield may be adjusted to a position of non-use which, generally speaking, is in a position folded substantially against the inside trim of the roof of the vehicle.

More specifically, the invention contemplates a transparent or translucent-like filtering element or panel arranged to be adjusted into and out of a position in the line of vision forwardly through the windshield of the vehicle. When in such a position it may intercept or filter out some direct rays of the sun but more particularly the indirect rays which may be reflected from the atmosphere, from the road, from other vehicles or from the forward position of the user's vehicle, including the hood, fenders, a dirty windshield, or dash board.

Other objects of the invention will be appreciated as the following detailed description is considered in conjunction with the accompanying drawings.

The drawings illustrate forms of the device made in accordance with the invention.

Fig. 1 is a somewhat diagrammatic view, largely in cross section, showing one form of device constructed in accordance with the invention, and illustrating the same in one position of use and in folded position in dotted lines.

Fig. 2 is a view similar to Fig. 1 illustrating a modified form.

Fig. 3 is a view similar to Figs. 1 and 2 showing a further modified form.

Fig. 4 is a perspective view of the type of glare shield illustrated in Fig. 1 and showing the hinge mounting therefor.

Fig. 5 is an enlarged cross sectional view taken substantially on line 5—5 of Fig. 4 showing the partial frame for the glare shield panel.

Fig. 6 is a view illustrating the mounting structure of the form shown in Fig. 2.

Fig. 7 is a perspective view of a portion of a glare shield illustrating the type of mounting used in Fig. 3.

Fig. 8 is a sectional view taken through one of the hinge mountings showing the friction type of hinge which may be used.

Fig. 9 is a perspective view showing the interior of a vehicle and illustrating the visor and glare shield adjusted to a position of non-use and showing the type of mounting illustrated in Figs. 1 and 4.

Figure 10:
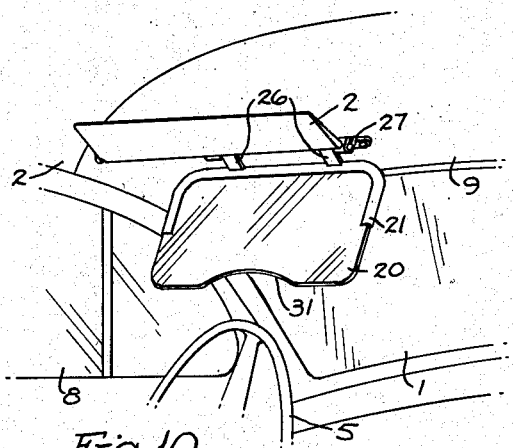
Fig. 10 is a view similar to Fig. 9 showing the glare shield in a position of use with the opaque visor in a position of non-use.

As shown in the drawings there are various parts of a vehicle, including the usual windshield 1, the top of the body 2, the exterior hood portion of the vehicle 3. As illustrated in Fig. 9 there is the usual passenger seat 4, steering wheel 5, instrument panel 6, and a door 7 with a window 8 therein positioned at the side of the vehicle.

The portion of the vehicle body, just above the windshield may be termed a header board, this portion being illustrated at 9.

Figure 11:
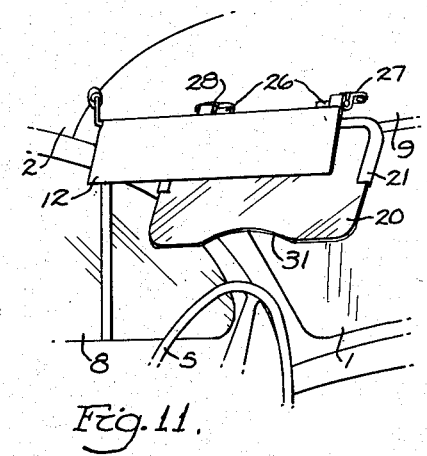
Fig. 11 is a view similar to Fig. 9 showing the glare shield and the visor both adjusted to a position of use.
Figure 12:
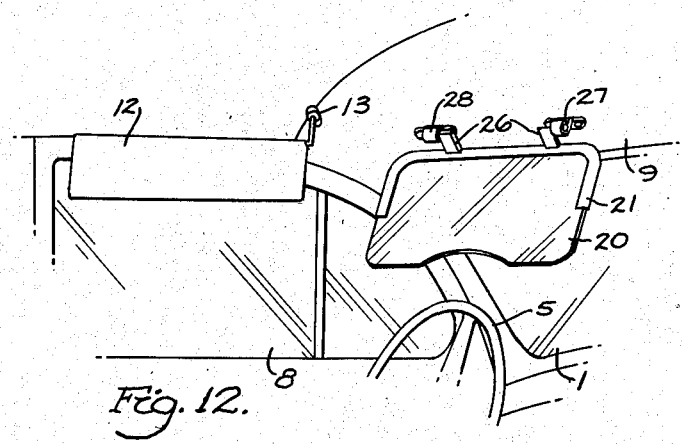
Fig. 12 is a view similar to Fig. 9 illustrating the glare shield in a position of use and with the opaque visor adjusted to a position at the side of the vehicle.
Figure 13:
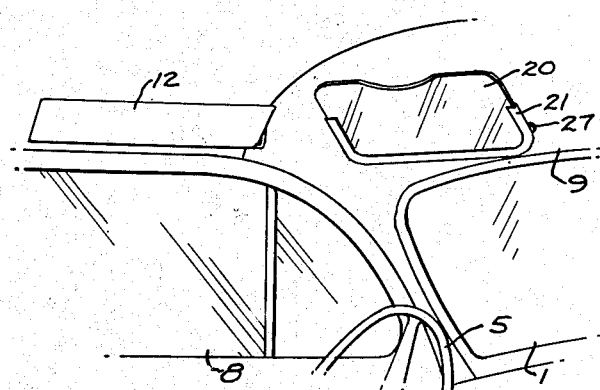
Fig. 13 is a view similar to Figs. 9 and 12 showing the opaque visor adjusted to a position of non-use at the side of the vehicle and with the glare shield adjusted to a position of non-use.

As mentioned above it is almost the universal practice to equip vehicles with opaque interior sun visors. This is usually a panel covered with a fabric, and as shown in some of the figures, such a panel is illustrated at 12. It is customarily mounted at a position approximately at the intersection of the header board 9 and the side of the top 2. This mounting is shown at 13. The mounting 13 need not be considered in detail but suffice it to say that it is usually arranged so that the visor may be swung pivotally to a folded position of non-use as shown by the full lines in Figs. 1, 2 and 3, and as illustrated in Fig. 10, and it may be swung on its pivot into a downwardly extending position, as shown in Fig. 11. The visor may be also swung on its mounting, which may be in the form of a ball and socket mounting, or a mounting of that type, to a position shown in Fig. 12, and may also be adjusted to a position of non-use and extending along the side of the vehicle above the window 8 as shown in Fig. 13.

The sun visor shown in the drawing is the one used by the driver of the vehicle although usually another sun visor is provided at the opposite side of the vehicle for the other occupant or occupants. Likewise the glare shield of the present invention is shown for the driver of the vehicle although another glare shield may and preferably is used for the occupant or occupants sitting alongside of the driver. For convenience, in making the description, the terms used herein are "visor" for the usual inside visor placed in the vehicle and "glare shield" for the device of the present invention.

Such a glare shield is shown in Fig. 4 and it comprises a ray filtering panel 20. This panel can be made of suitable ray filtering material and it may embody various elected structures. For example, it may be a solid piece of colored glass; it may be a laminated panel comprising two sheets of glass with an intervening layer material, such as plastic, for filtering the rays, or it may comprise laminated glass sheets, of which either one or both may be colored. These variations are within the choice of the manufacturer and user. The panel 20 is preferably frictionally mounted in a partial frame 21 as by mounting it under pressure with a resilient material 22, such as glazing tape and thus the panel is mounted without the necessity of drilling holes therethrough. The partial frame is of suitable metal of channel formation.

In order to mount the glare shield to provide for full and unencumbered use and adjustment of the visor, mountings of hinge construction are preferably used, so that the glare shield may be folded into a position of non-use, as illustrated in Figs. 1, 2 and 3, in which position the glare shield underlies the visor. Such a mounting construction is shown in Figs. 1 and 4. In these views the axis members or pintles 25 are mounted on the topmost part of the frame 21 so that they are substantially in the plane of the upper edge of the panel and extend above so that the hinge axis is removed laterally from the plane of the panel. In this connection, the upper edge is considered to be the edge which is uppermost when the panel is adjusted to the full line position of use as shown in Fig. 1. To this end, the pintles may be secured to the channel by arms or struts 26 which extend substantially perpendicular from the side of the frame 21. Securing devices, as generally indicated at 27, have apertured base portions 28 so as to be secured, as by means of screws or the like, to the header board, and each securing device is fashioned as at 29 to provide a bearing for a pintle and this may be tightened as by means of a screw 30 to provide the requisite friction so that the panel is held in any desired position of adjustment. The panel is advantageously provided with a cut out or recess formation 31 to provide the clearance for the steering wheel and the hands of the operator manipulating the steering wheel.

In the design shown in Fig. 1, the mounting of the panel is such that the panel is offset from the hinge axis. Therefore, when the glare shield is adjusted upwardly along the top of the vehicle, there is an adequate space between the glare shield and the interior of the vehicle to accommodate the visor. When the glare shield is pivoted downwardly to operating position, the upper edge thereof swings in an arc about the hinge axis moving somewhat in an upward direction, in order to cover the top section of the windshield. Preferably, the glare shield is used while in a slanting position; i. e., the panel slants from the vertical so that the lower edge thereof is nearer the occupant than the upper edge. In this position, reflections which may come from various interior parts of the vehicle are not reflected into the eyes of the occupant. The glare shield is preferably so proportioned that when it is in operating position, the adjacent portions of the windshield visible to the driver are adequately covered so that there are no substantial open areas or light leaks.

When the glare shield alone is used, it may be adjusted to the position shown by the full lines in Fig. 1, leaving the visor in its position of non-use. This is also illustrated in Fig. 10. If it is necessary to block out direct rays of the sun, the opaque visor may be adjusted to the position shown in Fig. 11. If the sun's rays come from the side the opaque visor may be adjusted to the position shown in Fig. 12, and it also may be adjusted to a position of non-use as shown in Fig. 13. When the visor is in the position of Fig. 12 or Fig. 13, there is no interference with the adjustable movements of the glare shield.

In a modified form of a mounting, as shown in Fig. 6, the pintles 34 are positioned substantially in the plane of the panel and are located between the upper and lower edges thereof. The mounting member for each pintle has an elongated body 35 and an attaching foot 36 and a bearing portion which may be the same as that shown in Fig. 8. In this form as illustrated in Fig. 2, there is adequate space in which the visor is housed when the glare shield is adjusted upwardly to a position of non-use. When the glare shield is swung to a position in line of slight, the upper edge swings upwardly as will be appreciated by reference to Fig. 2. This modified construction also permits freedom of adjustment of the visor in the manner above described and as shown in Figs. 10 to 13.

In another modified form, as shown in Figs. 3 and 7, the pintles 40 are mounted so that the axis thereof is removed from the plane of the panel, this mounting being effected by supports 41 attached preferably to the legs of the channel frame 21, and the hinge axis of the pintles is between the upper and lower edges of the panel. The securing members are similar to those heretofore described, each having a body 42, a securing base 43 and a bearing portion which may be similar to that shown in Fig. 8. In this case, the body 42 may not be as long as the body 35 of the form shown in Fig. 6. This construction, like the previous ones, provides space for the sun visor when the glare shield panel is in a folded position of non-use as shown by the dotted lines in Fig. 3, and when the panel is manipulated to a position of use, the upper edge of the panel swings somewhat upwardly to the position shown by the full lines. This form likewise permits freedom of adjustment of the visor.

Figure 14:
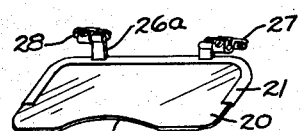
Fig. 14 is a view illustrating a further modified arrangement.

In the forms thus far described, the hinge axis of the panel is substantially parallel to the plane of the panel. This axis may be substantially horizontal. In some vehicles, however, the top of the enclosed body is considerably crowned; that is, in transverse section, the top of the body is considerably convex on its exterior and concave on its interior. To accommodate this situation, and in order that the panel may be folded well against the concave contour on the interior of the vehicle, the hinge axis may be disposed in an inclined manner to the plane of the panel as shown in Fig. 14. The structure shown in Fig. 14 is similar to that shown in Fig. 4 and like reference characters are applied to like parts. However, the arm 26a is relatively long as compared to the arm 26b. This has the effect of lowering the side of the panel connected to the arm 26a relative to the side of the panel connected to the arm 26b, and when the panel is adjusted to lie upwardly adjacent the inside of the top of the vehicle, the two opposite lower edges of the panel may be adjusted substantially flush against the inner surface of the top of the body to provide full head room.

I claim:

The combination in an automotive vehicle having a body with a forwardly facing windshield, a side window, and a sun visor, a universal type mounting for the sun visor including a substantially vertical axis member and a substantially horizontal axis member located above the windshield for movement of the visor into shielding position with respect to the windshield, into shielding position with respect to the side window and into a position of non-use adjacent the inner surface of the top of the body; a glare shield comprising a panel of light filtering material, securing means attached directly to the top portion of the body above the windshield, supporting means on the panel adjacent one edge thereof, the securing means and the supporting means having cooperating portions providing a pivotal connection, said securing means maintaining said pivotal connection on a fixed axis extending in a direction crosswise of the vehicle body, the supporting means maintaining said axis in a fixed position adjacent to and substantially parallel to said edge of the panel, so that the glare shield is restricted to pivotal movement on the fixed axis and may be swung only into shielding position with respect to the windshield while the sun visor may be independently shifted to shielding position at a side window, and whereby the glare shield may be shifted into shielding position with respect to the windshield and into a position of non-use adjacent the inner surface of the top of the body independently of the sun visor, and into shielding position with respect to the windshield conjointly with the sun visor and into said position of non-use conjointly with and in overlapping relationship with the sun visor.

FREDERICK D. KNOBLOCK.

REFERENCES CITED

The following references are of record in the file of this patent:

UNITED STATES PATENTS

| Number | Name | Date |
| --- | --- | --- |
| 1,694,552 | Menczer | Dec. 11, 1928 |
| 2,100,872 | Randall | Nov. 30, 1937 |
| 2,112,726 | Kemp et al. | Mar. 29, 1938 |
| 2,236,710 | Hocking | Apr. 1, 1941 |
| 2,261,881 | Horstmann | Nov. 4, 1941 |